United States Patent [19]

Scobie

[11] 4,411,438
[45] Oct. 25, 1983

[54] PACKING GLAND

[75] Inventor: William B. Scobie, Houston, Tex.

[73] Assignee: Keystone International, Inc., Houston, Tex.

[21] Appl. No.: 254,958

[22] Filed: Apr. 16, 1981

[51] Int. Cl.³ .............................................. F16J 15/18
[52] U.S. Cl. ..................................... 277/105; 277/123
[58] Field of Search ............... 277/105, 115, 119, 123, 277/124, 125, 61, 64

[56] References Cited

U.S. PATENT DOCUMENTS

| 860,035 | 7/1907 | Kerr | 277/64 |
|---|---|---|---|
| 1,182,146 | 5/1916 | Crispin | 277/105 |
| 2,137,328 | 11/1938 | Bissell | 308/36.1 |
| 2,587,474 | 2/1952 | Howard | 277/123 |
| 2,711,333 | 6/1955 | Rodgers | 277/124 |
| 3,223,425 | 12/1965 | Leman | 277/115 |
| 3,262,710 | 7/1966 | Hansen et al. | 277/105 |
| 4,156,529 | 5/1979 | Hafele | 277/125 |

FOREIGN PATENT DOCUMENTS 254917 11/1911 Fed. Rep. of Germany .
375251 11/1923 Fed. Rep. of Germany .

Primary Examiner—Robert I. Smith
Attorney, Agent, or Firm—Browning, Bushman, Zamecki & Anderson

[57] ABSTRACT

A stuffing box assembly comprises a housing including a main body, a tubular neck extending outwardly from the main body, and a housing flange extending generally radially outwardly from the neck and longitudinally spaced from the main body. A bore extends longitudinally through the neck and the adjacent part of the main body, and a slot communicating with the bore opens radially outwardly through the neck on the opposite side of the housing flange from the main body. A shaft is received in the bore for movement with respect to the housing, and an annular seal within the bore surrounds the shaft. The gland has a compression formation disposed at least partially within the bore adjacent one end of the seal and a flange joining the compression portion and extending laterally outwardly through the slot in the housing. The gland is movable toward the seal to compress it. An adjusting screw disposed generally parallel to the valve stem is threadedly connected to the flange on the gland and has an engagement formation, such as a screw head, abutting the side of the housing flange closest to the main body of the housing and engageable to rotate and operate the adjusting screw.

21 Claims, 5 Drawing Figures

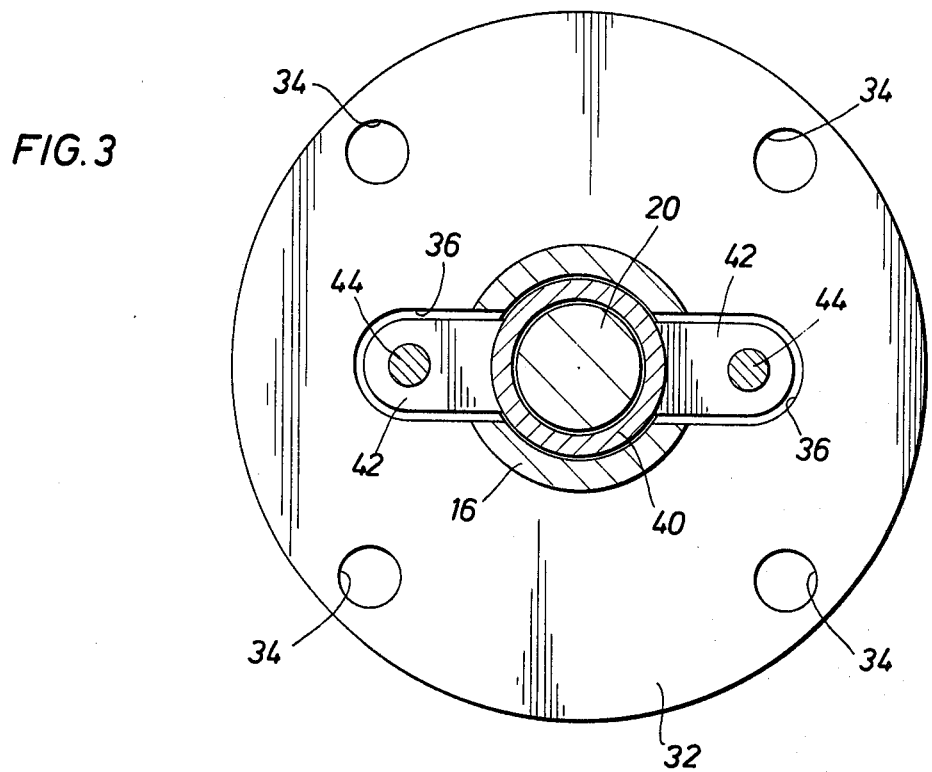
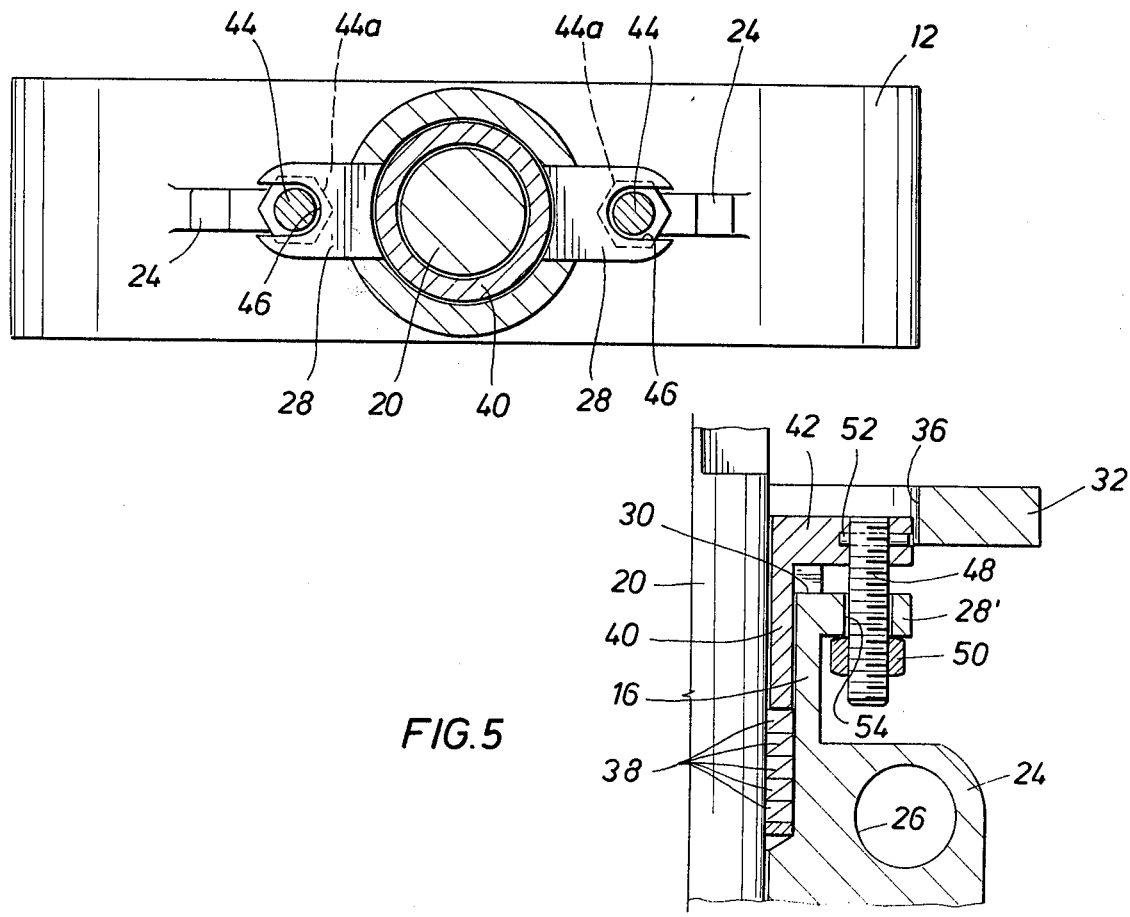

PACKING GLAND

BACKGROUND OF THE INVENTION

The present invention pertains to stuffing box assemblies, and more specifically, to an improved structure allowing easier access to the adjusting means by which the gland is tightened against the seal between a shaft and housing. The invention is particularly applicable to valve assemblies, wherein the necessity for mounting a valve actuator closely adjacent to the stuffing box makes access to such adjusting means difficult. However, various principles of the invention can also be applied to other types of apparatus, and will be particularly useful in those in which access to the adjusting means for a stuffing box gland is made difficult because of adjacent apparatus.

U.S. Pat. No. 2,711,333 and U.S. Pat. No. 3,223,425 illustrate generally what is probably the most common arrangement for providing adjustment of a packing gland for a stuffing box assembly. As shown in those patents, the gland is provided with a radial flange, and one or more studs mounted in the housing extend through that flange. On the opposite side of the flange from the housing, each stud is provided with an adjustable nut which, when threaded inwardly toward the housing, urges the gland ahead of it thus compressing the seal. U.S. Pat No. 860,035 illustrates a variation for an apparatus in which there are two generally oppositely directed glands arranged such that both of them can be tightened by a common set of studs and adjusting nuts.

One of the primary difficulties in accommodating the general scheme illustrated in U.S. Pat. No. 2,711,333 and U.S. Pat. No. 3,223,425, discussed above, to valve assemblies is that which occurs when a valve actuator must be mounted on the housing closely adjacent the stuffing box. This requires that some portion of the housing, or an appendage thereto extend past the stuffing box and the gland adjusting system while still allowing access to the latter. One approach to this problem is illustrated in U.S. Pat. No. 4,156,520. As shown in this patent, the actuator is not mounted directly on the neck of the valve body or housing, but rather, is mounted on supports spaced laterally outwardly from the valve stem and valve neck, the latter being truncated. This approach has several disadvantages. In the first place, it is expensive in that it requires a greater amount of material and machining thereof to form the actuator support structure, whether it is formed integrally with the valve housing or attached thereto. Furthermore, access to the actuating nuts for adjusting the packing gland is still relatively difficult in that the nuts must be reached through windows formed by the actuator support structure, and in some cases, parts of the actuator and/or other ancillary apparatus may even overhang these windows.

Another approach is illustrated in U.S. Pat. No. 2,587,474. In this structure a sleeve which bears on the upper end of the packing gland to force it downwardly is threaded about the exterior of the neck portion of the housing. This arrangement is also undesirable, particularly in valve assemblies, in that it requires external machining of the neck and a more extensive gland structure, including a bulky sleeve which consumes additional space about the exterior of the neck.

SUMMARY OF THE INVENTION

The present invention provides a stuffing box and gland adjusting system which not only allows easy access to the adjusting means, even where an actuator or like apparatus must be mounted closely adjacent the housing, but also minimizes the amount of material and structure which must be provided in the general valve neck/actuator support area, and further without compensatory enlargement or embelishment of the structure of the gland itself.

One important feature of the present invention is that the housing is provided with one or more flanges extending generally laterally outwardly from the valve neck, and spaced longitudinally along the valve neck from the main body portion of the valve housing. The engagement portion of the gland adjusting means, e.g. nut or screw head, which must be engaged and rotated to tighten the packing is located in the space thus provided, i.e. longitudinally between the aforementioned housing flange and the main body portion of the valve housing, whereas the actuator is mounted on a second flange located on the opposite side of the first mentioned flange from the main body portion of the housing.

Another important feature of the assembly of the present invention is that, preferably between the housing flange means and actuator mounting flange described above, the housing is provided with a slot opening radially through the valve neck and communicating with the bore of the valve neck. The packing gland, which has a compression portion extending into the bore for engagement with the seal, also has a flange extending laterally outwardly through the slot for engagement with its adjusting means.

The structure described above allows for the elimination of bulky lateral actuator supports or the like which not only increase the expense of the apparatus but interfere with access to the engagement portion of the adjusting means. Such access is further facilitated by the fact that said engagement portion is located on the opposite side of the housing flange from the actuator.

Although these features can be employed with adjusting means in which a stud is fixedly secured to the gland flange, loosely extended through the housing flange, and threadedly engaged by an adjusting nut, even further advantages are achieved by providing the adjusting means in the form of a screw threadedly connected to the gland flange, loosely extending through the housing flange, and having a head which abuts the latter flange to not only serve as the aforementioned engagement portion, but also to cooperate with the housing flange in limiting movement of the screw generally longitudinally away from the seal. Accordingly, when the screw is rotated in a direction which would tend to move it away from the seal, the gland will instead be moved toward the seal. However, because the screw need not move, it will not advance into the space between the housing flange and the main body of the valve housing, and this simplifies spacing problems.

Accordingly, it is a principal object of the present invention to provide an improved stuffing box assembly.

Another object of the present invention is to provide such an assembly which provides ready access to the adjusting means for the packing gland by eliminating the need for lateral support structures for ancillary apparatus such as a valve actuator.

Still another object of the present invention is to provide such as assembly which minimizes the amount of material or structure which must be employed in the neck area of the housing.

A further object of the present invention is to provide such an assembly which eliminates adjusting nuts, utilizing only adjusting screws, the latter remaining longitudinally fixed during adjustment of the gland.

Another object of the present invention is to provide such an assembly in which the housing has a lateral slot or hole through which the gland flange extends.

Yet a further object of the present invention is to provide such an apparatus in which both the gland flange and a cooperative housing flange are longitudinally spaced from the main body portion of the housing, with the engagement portion of the gland adjusting means being located in the space thus provided.

Still other objects, features, and advantages of the present invention will be made apparent by the following detailed description of preferred embodiments, the drawings, and the claims.

BRIEF DESCRIPTION OF THE DRAWINGS

FIG. 3 is a transverse cross section taken along the line 3—3 of FIG. 2 and looking in the direction of the arrows.

FIG. 4 is a transverse cross section taken along the line 4—4 in FIG. 2 and looking in the direction of the arrows.

FIG. 5 is a detailed view, similar to the upper right portion of FIG. 2, showing a modification of the invention.

DESCRIPTION OF THE PREFERRED EMBODIMENTS

Figure 1:
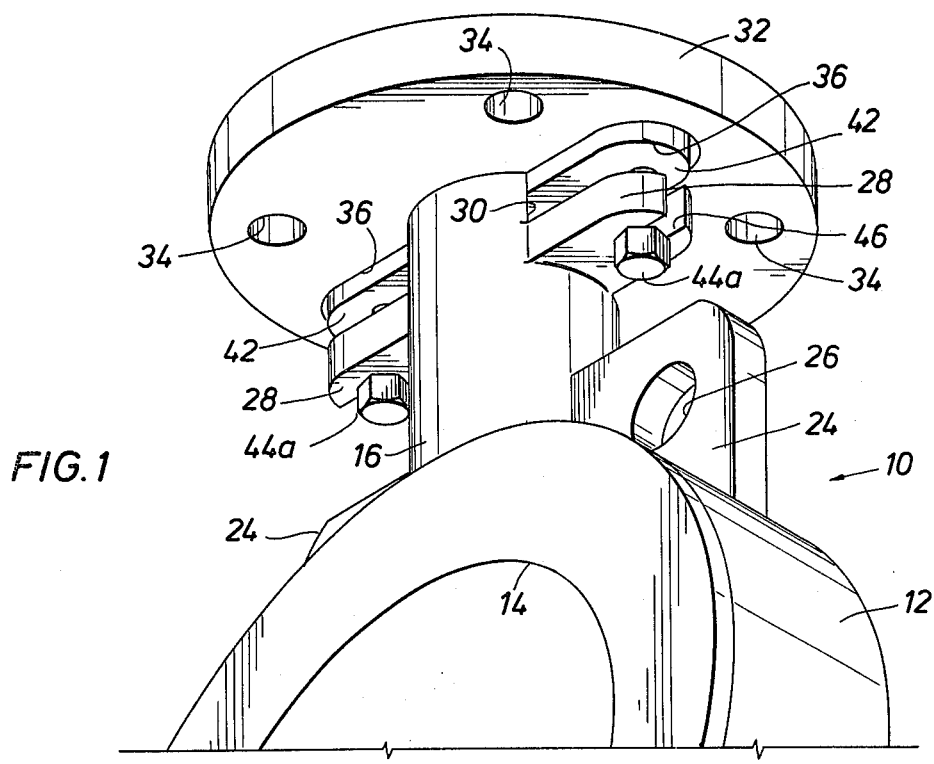
FIG. 1 is a partial perspective view of the stuffing box area of a valve assembly.

Referring first to FIG. 1 there is shown the upper portion of a valve assembly, more specifically a butterfly valve. The valve assembly includes a housing 10 comprising a generally annular main body portion 12 defining a fluid flowway 14. Housing 10 also includes a generally tubular neck portion 16 formed integrally with main body portion 12. In the normal operating position, neck 16 will extend generally upwardly from main body portion 12, and in any event, the length of neck portion 16 extends generally radially with respect to flowway 14. As used herein, terms such as "radially," "longitudinally," "laterally," etc., unless otherwise indicated, will denote orientation with respect to neck 16.

Figure 2:
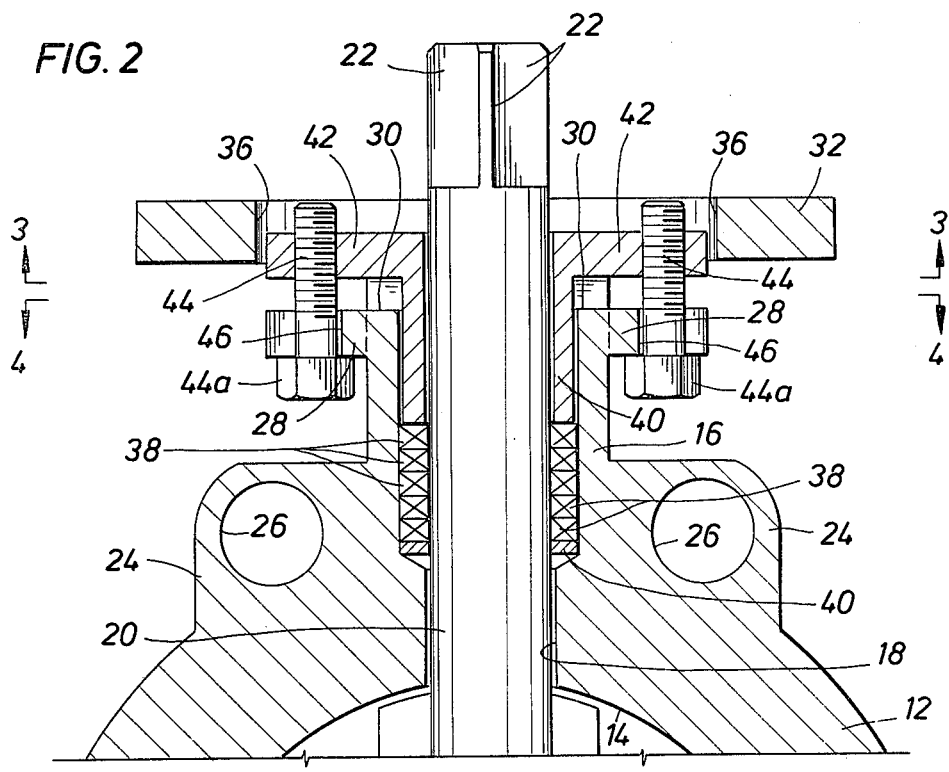
FIG. 2 is a longitudinal cross-sectional view of the apparatus of FIG. 1.

Referring now to FIGS. 2, 3 and 4 in conjunction with FIG. 1, the valve housing or valve body 10 has a bore 18 extending longitudinally through neck 16 and through the adjacent part of main body portion 12 into communication with flowway 14. In a manner well known in the art, a valve element in the form of a disk (not shown) is rotatably mounted in flowway 14 to open and close the latter. Specifically, the valve element is mounted on a shaft or valve stem 20 which extends outwardly through bore 18 and is rotatably mounted therein. The outer end of valve stem 20 extends beyond housing 10 and has wrench formations 22 thereon for engagement with a valve actuator to be mounted on top of housing 10. Main body 12 of housing 10 also includes integral tabs 24 formed on the upper side of main body portion 12 generally on opposite sides of neck 16. Each tab 24 has a bore 26 therethrough for receipt of a stud or the like used in mounting the valve assembly in a pipeline or the like. Housing 10 further includes housing flange means in the form of a pair of diametrically opposed flanges or ears 28 extending laterally outwardly from neck 16 at a position spaced longitudinally along neck 16 from main body portion 12 of the valve housing. Extending upwardly from the upper side of flanges 28 are a pair of slots 30 each communicating with bore 18 and opening radially outwardly through neck 16 directly above a respective one of the flanges 28. Finally, integrally formed at the upper end of neck 16 is an annular mounting flange 32 on which the valve actuator would be mounted. Flange 32 has a plurality of bores 34 for receiving bolts or the like to secure the valve actuator to the flange. Flange 32 also has a pair of diametrically opposed recesses 36 each continuous with and forming the upper portion of a respective one of the slots 30.

The upper portion of bore 18 is counterbored as shown in FIG. 2 to provide an annular space between valve stem 20 and the surrounding portion of housing 10 to receive a stack of packing rings diagramatically indicated at 38. Rings 38 may be of any conventional type, usually at least partially comprised of an elastomer, and in any event, deformable so that, when compressed longitudinally, they will expand radially and seal tightly between valve stem 20 and housing 10. A rigid support ring 40 rests on the shoulder formed between the large and small diameter portions of bore 18 to support packing rings 38 thereabove. A packing gland has a cylindrical compression portion 40 surrounding valve stem 20 and extending into bore 18 to rest on the upper end of the stack of packing rings 38. Integrally formed with compression portion 40 are a pair of gland flange arms 42 each extending laterally outwardly through a respective one of the slots 30 in the housing. In the longitudinally outermost position, flange arms 42 are received in recesses 36. The fit of compression portion 40 about shaft 20 and within bore 18 is loose enough to permit it to move longitudinally inward, the lower portions of slots 30 (in neck 16) permitting movement of flange arms 42. It can be seen that, if the gland 40, 42 is driven inwardly, i.e., toward the stack of seal rings 38, it will compress the seal rings. Thus, the gland can be used to tighten the seal between the valve stem and housing as desired.

In order to provide for such longitudinal adjustment of gland 40, 42, a pair of adjusting screws 44 are provided. Each of the screws 44 is oriented with its head 44a lowermost and its shank extending upwardly therefrom. As shown, the head 44a of each screw abuts the underside of a respective one of the housing flanges 28, with the shank being rotatably but non-threadedly received in a slot 46 in that flange. Thence, the shank of the screw 44 extends further longitudinally outwardly and is threadedly connected to a respective one of the gland flanges 42. It can be seen that the abutment of the screw heads 44a with the flanges 28 will prevent movement of screws 44 in an upward direction, i.e., away from the stack of seal rings 38. Thus, if screws 44 are engaged by their heads 44a and rotated in the direction which would tend to drive them upwardly, the gland 40, 42 will instead be driven downwardly against the seal rings 38 to tighten their sealing engagement as described above.

It can be seen that the arrangement described above has numerous advantages over prior art stuffing box arrangements, particularly those commonly used on valves. The heads 44a which form the engagement portions of the adjusting screws 44, are disposed in the spaces formed between flanges 28 and tabs 24 and are readily accessible for engagement to adjust the gland 40, 42. This represents a great advantage over prior art arrangements wherein the adjusting nuts were not only disposed close to the actuator, but were also blocked laterally outwardly by the actuator support formations paralleling the valve neck proper. Nevertheless, this advantage is obtained without significantly increasing the amount of material used in the valve neck area, the only valve housing structures specifically provided for the purpose of cooperating with the adjusting system being the two relatively small flanges 28.

Referring now to FIG. 5, there is shown a modification of the invention in which like parts have been given like reference numerals. More specifically, all parts of the structure of FIG. 5 are identical to that of FIGS. 1-4 except for the gland adjusting means. In the structure of FIG. 5, the screw 44 with its integral head 44a has been replaced by a screw 48 having an adjustable nut 50 threadedly connected thereto. One end of screw 48 is fixedly secured to gland flange 42 by a pin 52. From flange 42, screw 48 extends downwardly and is non-threadedly received in an oversized bore 54 in housing flange 28'. Nut 50 is secured to the lower end of screw 48 so that it abuts the underside of flange 28'. Thus, if nut 50 is rotated in the proper direction, screw 48 and gland 40, 42 will be jointly drawn downwardly to compress the seal rings 38. Although both embodiments of the invention achieve the general advantages of providing ready access to the engagement portion (44a or 50) of the gland adjusting means, while reducing the amount of metal which must be provided in the neck area of the valve housing, the embodiment of FIGS. 1-4 may be preferred since it does not require that any portion of the gland adjusting means move downwardly along with the gland, such movement being limited by the upper end of tab 24.

Numerous modifications of the preferred embodiments described above will suggest themselves to those of skill in the art. Accordingly, it is intended that the present invention be limited only by the claims which follow.

I claim:

1. A stuffing box assembly comprising:
   housing means including
     a main body portion,
     a generally tubular neck portion extending outwardly from said main body portion,
     said housing means having a bore extending through said neck portion and the adjacent part of said main body portion,
     and housing flange means extending laterally outwardly from said neck portion and longitudinally spaced along said neck portion from said main body portion;
   a shaft received in said bore for movement with respect to said housing means;
   annular seal means within said bore surrounding said shaft;
   gland means comprising
     compression means disposed at least partially within said bore adjacent one end of said seal means,
     and gland flange means adjoining said compression means and extending laterally outwardly therefrom generally parallel to said housing flange means externally of said bore,
     said gland means being movable in a first longitudinal direction toward said seal means to compress said seal means;
   an adjusting screw disposed generally parallel to said shaft, threadedly connected to said gland flange means, and rotatably but non-threadedly received in said housing flange means, and having an engagement portion disposed externally of said housing means and said gland means and longitudinally between said housing flange means and said main body portion, said engagement portion being engageable to rotate said adjusting screw;
   and stop means cooperative between said adjusting screw and said housing means to limit movement of said adjusting screw in a second longitudinal direction opposite to said first direction.

2. The assembly of claim 1 wherein said engagement portion of said adjusting screw is a screw head abutting said housing flange means, said screw head and said housing flange means forming said stop means.

3. The assembly of claim 1 wherein said housing means has a slot opening generally radially through said neck portion in communication with said bore on the opposite side of said housing flange means from said main body portion, said gland flange means extending laterally outwardly through said slot.

4. The assembly of claim 3 wherein said housing means has two such slots, diametrically opposed to each other, wherein said gland flange means comprises a pair of diametrically opposed flange arms each extending through a respective one of said slots, said assembly comprising two such adjusting screws each engaged with a respective one of said flange arms of said gland flange means.

5. The assembly of claim 4 wherein said housing means further comprises mounting flange means extending generally radially outwardly from the longitudinally outer extremity of said neck portion for mounting ancillary apparatus on said housing means.

6. The assembly of claim 5 wherein said mounting flange means has recess means forming outer portions of said slots for receiving said gland flange means in an outermost position thereof.

7. The assembly of claim 6 wherein said housing means is a valve housing, said shaft is a valve stem, and said mounting flange is adapted for mounting a valve actuator.

8. The assembly of claim 7 wherein said housing flange means comprises a pair of diametrically opposed flange ears each parallel to a respective one of said flange arms of said gland flange means.

9. A stuffing box assembly comprising:
   housing means including
     a main body portion,
     a generally tubular neck portion extending outwardly from said main body portion,
     said housing means having a bore through said neck portion and the adjacent part of said main body portion,
     and said housing means having at least one slot opening generally radially through said neck portion in communication with said bore,
     and housing flange means extending generally radially outwardly from said neck portion adjacent said slot;

a shaft received in said bore for movement with respect to said housing means;

annular seal means within said bore surrounding said shaft;

gland means comprising compression means disposed at least partially within said bore adjacent one end of said seal means, and gland flange means adjoining said compression means and extending laterally outwardly through said slot, said gland means being movable in a first longitudinal direction toward said seal means to compress said seal means;

and threaded adjusting means operatively interengaged between said housing flange means and said gland flange means and operative to move said gland means in said first direction, said adjusting means having a rotatable engagement portion engageable to operate said adjusting means, said engagement portion being disposed on the opposite side of said housing flange means from said gland flange means.

10. The assembly of claim 9 wherein said slot is longitudinally spaced from said main body portion of said housing means, and said housing flange means is disposed immediately adjacent the end of said slot closest to said main body portion.

11. The assembly of claim 10 wherein said housing means further comprises mounting flange means extending generally radially outwardly from the longitudinally outer extremity of said neck portion for mounting ancillary apparatus on said housing means.

12. The assembly of claim 10 wherein said engagement portion of said adjusting means is disposed longitudinally between said housing flange means and said main body portion.

13. The assembly of claim 10 wherein said housing means has two such slots, diametrically opposed to each other, wherein said gland flange means comprises a pair of diametrically opposed flange arms each extending through a respective one of said slots, said assembly comprising two such adjusting means, each engaged with a respective one of said flange arms of said gland flange means.

14. The assembly of claim 13 wherein said housing flange means comprises a pair of diametrically opposed flange ears each parallel to a respective one of said flange arms of said gland flange means.

15. A stuffing box assembly comprising:

housing means including a main body portion, a generally tubular neck portion extending outwardly from said main body portion, said housing means having a bore through said neck portion and the adjacent part of said main body portion, and said housing means having at least one slot opening generally radially through said neck portion in communication with said bore, and housing flange means extending generally radially outwardly from said neck portion adjacent said slot;

a shaft received in said bore for movement with respect to said housing means;

annular seal means within said bore surrounding said shaft;

gland means comprising compression means disposed at least partially within said bore adjacent one end of said seal means, and gland flange means adjoining said compression means and extending laterally outwardly through said slot, said gland means being movable in a first longitudinal direction toward said seal means to compress said seal means;

and threaded adjusting means engaged with said housing flange means and said gland flange means and operative to move said gland means in said first direction, said adjusting means having a rotatable engagement portion engageable to operate said adjusting means, said adjusting means comprising an adjusting screw fixedly connected to said gland flange means and rotatably but non-threadedly received in said housing flange means, said adjusting means further including an adjusting nut threadedly connected to said adjusting screw and abutting said housing flange means and serving as said engagement portion of said adjusting means.

16. A stuffing box assembly comprising:

housing means including a main body portion, a generally tubular neck portion extending outwardly from said main body portion, said housing means having a bore through said neck portion and the adjacent part of said main body portion, and said housing means having at least one slot opening generally radially through said neck portion in communication with said bore, and housing flange means extending generally radially outwardly from said neck portion adjacent said slot;

a shaft received in said bore for movement with respect to said housing means;

annular seal means within said bore surrounding said shaft;

gland means comprising compression means disposed at least partially within said bore adjacent one end of said seal means, and gland flange means adjoining said compression means and extending laterally outwardly through said slot, said gland means being movable in a first longitudinal direction toward said seal means to compress said seal means;

and threaded adjusting means engaged with said housing flange means and said gland flange means and operative to move said gland means in said first direction, said adjusting means having a rotatable engagement portion engageable to operate said adjusting means, said adjusting means including an adjusting screw threadedly connected to said gland flange means and rotatably but non-threadedly received in said housing flange means, said adjusting screw having a head abutting the opposite side of said housing flange means from said gland flange means to limit movement of said adjusting screw in a second longitudinal direction opposite to said first direction, and said head being engageable to operate said adjusting screw.

17. A stuffing box assembly comprising:

housing means including a main body portion, a generally tubular neck portion extending outwardly from said main body portion, said housing means having a bore through said neck portion and the adjacent part of said main body portion, and said housing means having at least one slot opening generally radially through said neck portion in communication with said bore and longitudinally spaced from said main body portion, and housing flange means extending generally radially outwardly from said neck portion immediately adjacent the end of said slot closest to said main body portion;

mounting flange means extending generally radially outwardly from the longitudinally outer extremity of said neck portion for mounting ancillary apparatus on said housing means, said mounting flange means having recess means forming an outer portion of said slot a shaft received in said bore for movement with respect to said housing means;

annular seal means within said bore surrounding said shaft;

gland means comprising compression means disposed at least partially within said bore adjacent one end of said seal means, and gland flange means adjoining said compression means, extending laterally outwardly through said slot, and receivable in said recess means in an outermost position, said gland means being movable in a first longitudinal direction toward said seal means to compress said seal means;

and threaded adjusting means engaged with said housing flange means and said gland flange means and operative to move said gland means in said first direction, said adjusting means having a rotatable engagement portion engageable to operate said adjusting means.

18. The assembly of claim 17 wherein said housing means is a valve housing, said shaft is a valve stem, and said mounting flange is adapted for mounting a valve actuator.

19. A valve assembly comprising:
a valve housing including
a main body portion,
a generally tubular neck portion extending outwardly from said main body portion, and housing flange means extending generally radially outwardly from said neck portion and longitudinally spaced from said main body portion, said valve housing having a bore through said neck portion and the adjacent part of said main body portion;

a valve stem received in said bore for movement with respect to said valve housing;

annular seal means within said bore surrounding said valve stem;

gland means comprising compression means disposed at least partially within said bore adjacent one end of said seal means, and gland flange means adjoining said compression means and extending laterally outwardly therefrom and longitudinally spaced from said main portion of said valve housing, said gland means being movable in a first longitudinal direction toward said seal means to compress said seal means;

and threaded adjusting means engaged with said housing flange means and said gland flange means and operative to move said gland means in said first direction, said adjusting means having a rotatable engagement portion disposed longitudinally between said flange means and said main body portion of said valve housing and engageable to operate said adjusting means.

20. The assembly of claim 19 wherein said adjusting means includes an adjusting screw fixedly connected to said gland flange means and rotatably but non-threadedly received in said housing flange means, said adjusting means further including an adjusting nut threadedly connected to said adjusting screw and abutting said housing flange means and serving as said engagement portion of said adjusting means.

21. The assembly of claim 19 wherein said adjusting means includes an adjusting screw threadedly connected to said gland flange means and rotatably but non-threadedly received in said housing flange means, said engagement portion comprising a screw head on said adjusting screw abutting said housing flange means, whereby said screw head and said housing flange means serve as stop means to limit movement of adjusting screw in a second longitudinal direction opposite said first direction.

* * * * *